(No Model.)
C. L. CLARKE.
ELECTRIC GENERATOR OR SPARK PRODUCING APPARATUS.
No. 324,010. Patented Aug. 11, 1885.
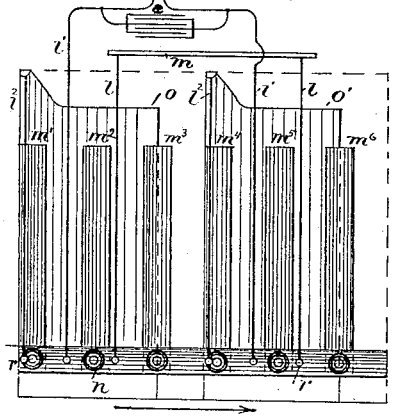
Witnesses.
Geo Willis Pierce,
Geo. H. E. Trouvelot.
Inventor
Charles Leigh Clarke
by attorney
Thos. D. Lockwood.

UNITED STATES PATENT OFFICE.

CHARLES LEIGH CLARKE, OF MANCHESTER, COUNTY OF LANCASTER, ENGLAND, ASSIGNOR TO THE DOMESTIC ELECTRICAL MANUFACTURING COMPANY, OF BOSTON, MASSACHUSETTS.

ELECTRIC GENERATOR OR SPARK-PRODUCING APPARATUS.

SPECIFICATION forming part of Letters Patent No. 324,010, dated August 11, 1885.

Application filed December 10, 1884. (No model.) Patented in England December 31, 1883, No. 5,992; in France May 19, 1884, No. 16,227; in Belgium May 20, 1884, No. 65,211; in Italy July 18, 1884, No. 17,143; in Spain November 20, 1884; in Austria-Hungary November 21, 1884, and in Germany May 8, 1885.

*To all whom it may concern:*

Be it known that I, CHARLES LEIGH CLARKE, of Manchester, in the county of Lancaster, Great Britain, have invented certain Improvements in Electric Generators or Spark-Producing Apparatus, (for which Letters Patent of Great Britain were granted me December 31, A. D. 1883, No. 5,992,)of which the following is a specification.

This invention relates to and constitutes an improved electric generator or source of electricity of that class sometimes denominated "convection-induction machines," wherein a small initial charge of electricity is, by the energy consumed by the rotation of the machine and the combined operations of induction and convection, increased to an indefinite extent, and manifested by disruptive discharges between two insulated electrodes or terminals in the form of sparks.

On July 12, 1884, I filed an application for Letters Patent for an improved apparatus for electrical gas-lighting, said application embodying the subject-matter of my present specification, and describing and claiming it specifically, as well as combined for use as a gas-lighting apparatus. Upon the requirement of the Patent Office the said application has been divided, and my present application constitutes the second division thereof, comprising the details of the generator.

My object is to provide a generator or source of electricity, which, with a minimum expenditure of power, and which, though of comparatively small size, shall be able to develop electricity of high potential in considerable quantities and to produce sparks by the transmission of such electricity between points at any reasonable distance from the location of said generator, so that such sparks may be utilized for lighting inflammable gases or vapors, and for various other purposes—such, for instance, as the firing of explosive charges in mining or blasting operations, for torpedo or artillery work, or for cigar-lighting apparatus.

In machines operating upon the principle to which I have hereinbefore referred an electrified body is made to act inductively upon a movable system of conductors in such a way as to produce a practically continuous generation of electricity, which is discharged between the extremities or points of the conducting-wires, which may be of any desired length within, of course, reasonable limits. By utilizing such a source of high tension I have experimentally demonstrated that I am enabled to dispense, for the applications of electricity above enumerated and for others affiliated thereto, with the usual costly and unenduring concomitants of electrical gas-lighting—*i. e.*, a voltaic battery, induction-coil, and circuit-breaker, which have heretofore been indispensable.

In the annexed drawings, Figure 1 is a vertical section of a portable gas-igniting apparatus embodying and energized by the generator forming my invention. Fig. 2 is a cross-sectional plan view on the line $a\ a$, looking down. Fig. 3 is a cross-section on the line $b\ b$, looking up; Fig. 4, a cross-section on the line $c\ c$, looking down. Fig. 5 is a cross-section on the line $d\ d$, looking down. Fig. 6 is a cross-section on the line $e\ e$, looking up, all of the said cross-sections referring to Fig. 1. Fig. 7 is a diagrammatic view, on Mercator's projection, of the electrical connections of my improved generator.

The gas-igniting apparatus shown in the drawings comprises four separate compartments—namely, the induction-generative apparatus and its actuating mechanism, each in its own chamber or compartment, the lighting-tube containing the conducting-wires and operative points, and a cell charged with some moisture-absorbing substance.

In the present case it is only necessary to consider the generator proper and its motor mechanism, merely remarking with respect to the lighting-tube that it contains two conducting-wires insulated from one another, which terminate at or near the end of the tube.

Should the generator be employed for other purposes, or for gas-lighting where the point of action is at a distance, the lighting-tube shown would of course by superseded by wires of desired length suitably insulated and branched to the several required points in a manner well understood.

The drying-chamber may or may not be used, according to circumstances. Ordinarily, it is not essential, although in localities of humid climate it forms an important adjunct to gas-lighting apparatus. When the generator is employed under other conditions, where portability is not as essential, it can usually be kept in a dry room.

The electrostatic or convective inductive generating apparatus which constitutes the invention is somewhat difficult to delineate by ordinary drawings, and I have therefore endeavored to indicate the electrical connections by the diagram Fig. 7, in which the cylinders are supposed to be split open and rolled out flat.

The machine is based partly upon Varley's electrostatic machine and partly upon the mousemill of Sir William Thomson. It consists of a hollow cylinder of non-conducting material—such as vulcanite—mounted delicately upon pivots or journals within a similar cylinder, and adapted by proper mechanism to rotate rapidly therein.

In the drawings, A is the outside vulcanite-cylinder, which also constitutes the external casing, and which is inclosed at one end by a partition, $p$, of like material, through which the terminal wires leading out extend, terminating, as shown in the drawings, in contact-springs $p'$ and $p^2$. It is obvious, however, that for many purposes these springs might profitably be replaced by binding-screws or other wire-attaching devices. The wall of the cylinder A extends upward a little above the cover, and is in the illustration threaded for the attachment of the outer cover, $z$, and the lighting-tube E. Two armatures or inductors, $o$ and $o'$, of thin metal foil, are fastened to the internal surface of the cylinder opposite one another, each equaling in width about one-third of the internal circumference of the cylinder. Six contact-springs, each consisting of a wire bent to a circular form at its free extremity, are permanently attached at one end to the closed end of the outer cylinder, A. These are arranged in three pairs, $l$, $l'$, and $l^2$. The springs $l$ at their fixed ends are fastened to the opposite ends of a light metal bar, $m$, which is let into the cover $p$ of the cylinder, so that from the free end of one of the springs $l$ to the free end of the other there is a continuous conducting-path. The springs $l'$ at their fixed ends are permanently united to the electrode contact-springs $p'$ and $p^2$, and provide the route for the escape or neutralization of the electricity. The springs $l^2$ are each connected to the projecting end or terminal of one of the inductor-armatures $o$ and $o'$.

The inner hollow cylinder, H, has an axis, $a$, extending through it from one end to the other, terminating at both ends in an arbor or journal by which the cylinder is rotatable in suitable fixed bearings, the upper bearing being the center of the metal bar $m$, while the lower is in the lower cover, $b$, of the metal motive-mechanism case, which I shall hereinafter describe. The cylinder H is provided with six metal foil carriers or conductors, $m'\ m^2\ m^3\ m^4\ m^5\ m^6$, each carrier being a strip of foil extending nearly the whole length of the cylinder, and having a width of about three-eighths of an inch, (the drawing being of actual working size.)

I may observe here that I do not limit myself to any specific size or dimension, as for some purposes it may be necessary to construct machines of different sizes. Provided the proportions indicated in the drawings are maintained, size is immaterial.

If desired, the carriers may be supported on disks at each end. They are, however, preferably cemented to the interior surface of the cylinder, and terminate at the lower end in a series of metal buttons or studs, $n$, which project for a short distance into the cylinder through the flange of the rubber base-plate. The carriers have no electrical connection with one another or with the electrodes or inductors $o\ o'$, except by means of the curved ends $r$ of the contact-springs $l$, which by the rotation of the inner cylinder are brought into successive contact with the carrier-buttons $n$. When the cylinder H is revolved, each carrier is thus brought into successive contact, through the contact-springs $l$, with the armatures, the electrode-wires, and the short-circuiting bar $m$. The shaft or axis $a$, passing through the inner cylinder, H, is insulated from contact with any conducting-surface by the sleeve $a'$, which protects it from contact, except at its ends, one of which is centered in the metal bar $m'$, while the other end is also at its bearing in contact with the metal work of the actuating mechanism.

The lighting-tube E and the wires and electrodes contained therein and attached thereto constitute, practically, a continuation of the inductive apparatus. Since I have in a separate application described the arrangement of said lighting tube, wires, and electrodes, it is not necessary that I should do more than refer to them here. The wires when brought to the proper length terminate in metal points between which sparks freely pass when the machine is in operation. The said lighting-tube or any suitable equivalent therefor screws into the metal cover $z$, which in turn screws onto the outer vulcanite cylinder, A.

I will now describe the actuating mechanism of the induction-generator, which, in the present instance, is separately inclosed in a metal compartment, B, this being screwed to the cylinder A, and also to the drying-chamber C, forming a connecting-link between them.

If the generator is desired for use as a portable gas-lighter, the small actuating mechanism, whereby slight power is enabled to rotate the working-cylinder, is a necessity, and is inclosed in the handle of the instrument.

It is in such circumstances so vital that it must be regarded as an integral feature of my invention. When, however, the machine is made on a larger scale, power from any external source may of course profitably be employed, the only change requisite being the absence of the small motor mechanism and the substitution of a pulley of convenient size for the pinion $a^2$. In addition to the parts shown in Fig. 1 the mechanism of the portable actuating device is also illustrated by Figs. 5 and 6. The spindle or axis $a$ of the inner cylinder, as hereinbefore stated, passes through the chamber B, passing loosely through the upper partition, $b'$, and centering at its lower end in the lower plate, $b$. A pinion, $a^2$, is fixed to the spindle $a$, as shown in Fig. 6. This pinion is engaged by the spur-wheel $i$, and a second pinion, $g'$, on the arbor $h$ of the spur-wheel, gears with the rack $g$, carried on the movable frame $d$, this frame being attached to and actuated by the push-button $c$, the shank of which, $c'$, passes through a hole in the casing B. The part $e$ at the interior surface of the hole is or may be fitted with a valve-seating, so that when the button is retracted the whole is air-tight. The spur-wheel works loose on the arbor $h$, and is maintained in mechanical connection with the said arbor and pinion $g'$ when the button $c$ and movable rack-frame $d$ are being pushed inwardly by the ratchet and pawl $h'$. When, however, the pressure is removed from the push-button $c$, the said button and its spindle are retracted by the spiral springs $s$, which are fastened to a fixed joint, $j$, on the interior peripheral surface of the metal casing B. When so retracted the pawl slides backward over the ratchet-teeth, so that all backward movement of the cylinder H is prevented. The inner cylinder of the induction-machine is by this actuating mechanism rapidly revolved at the requisite speed by simple pressure of the thumb upon the button $c$, which, as soon as the pressure is removed, is automatically retracted by the reaction of the springs $s$. When the generator is employed, as shown in the drawings, as a portable gas-igniting apparatus, a drying-cell, C, is an important adjunct, which in moist or damp localities may be filled with some porous fabric impregnated with chloride of calcium or other similar absorbing or drying substance; and, whenever necessary, such a chamber may be attached to the end of the generator as a drying-compartment. An alternative method, well known in the use of scientific apparatus, is to provide a vessel of strong sulphuric acid, which is placed within or near the generating-cylinder or an extension thereof.

Having now described the construction of the apparatus, I will now describe the method in which it operates:

When the instrument is to be used, the button $c$ is to be pressed by the thumb or fingers, while at the same time the electrodes of the end of the lighting-tube are directed to the point where the gas, vapor, or other inflammable element or compound is to be ignited. The actuating mechanism is thus caused to rotate the cylinder H rapidly, and electricity is developed in the following manner: The inductors or armatures $o$ and $o'$ may be regarded as having always a somewhat different potential, so that one practically has a slight positive and the other a small negative charge. It is in fact found to be difficult, if not impossible, to reduce them to the same potential, and as the smallest conceivable charge on one inductor of the machine is sufficient to excite it, after a few revolutions of the inner cylinder the inductors and carriers become highly charged and discharge themselves by means of the electrodes. Although it is, as explained, very difficult and almost impossible to discharge the apparatus totally, it is conceivable that such a condition may occur in consequence of protracted exposure to a damp atmosphere or from other causes. If it is at any time found that the instrument is discharged, it may readily be re-excited by simply rubbing the outside case or outer cylinder (which, as hereinbefore indicated, is made of vulcanite, ebonite, or some similar dielectric) with a silk cloth or a similar fabric. Referring now to the diagram Fig. 10, we may assume, therefore, the armature or inductor $o$ to have a small initial charge of electricity—say positive. The cylinder H, carrying on its interior surface the foil carriers $m'$, $m^2$, &c., is supposed to be revolving in the direction of the arrow. The inductor $o$ will induce a negative charge through the substance of the revolving cylinder in the carrier $m^2$ as the said carrier rotates past the contact-spring $l$. The carrier makes momentary contact with the round head $r$ of the said spring, and the positive electricity flows, by way of the contact-spring $l$, metal bar $m$, and complementary spring $l$ on the other side of said bar, to the opposite carrier, $m^5$, charging it positively. Since the metal bar $m$ is also in contact (through the journal and arbor of the cylinder, the actuating mechanism, and the fingers of the operator) with the earth, it may also be said that a portion of the original positive charge of the carrier $m^2$ flows to earth. The negative charge left on the carrier $m^2$ is by the continued rotation of the cylinder H conveyed onward until the next contact-spring, $l^2$, is reached, and the round end $r$ of that spring, impinging on the carrier, conducts the said charge away to the second inductor, $o'$, augmenting the original negative charge and leaving the carrier $m^2$ almost neutral. As the said carrier continues to rotate past the inductor $o'$, a positive charge is induced in it, due to the negative charge of the said inductor, and what negative electricity there is remaining flows off by the second contact-spring $l$, which by this time is reached. Still passing on, the positive charge in $m^2$ is brought round to the first inductor, $o$, and as the carrier makes contact with the round end $r$ of the spring $l^2$ the said charge is transferred to the inductor, augmenting the original positive charge existing therein. When the same carrier, $m^2$, again passes the first spring of the pair $l$, it receives, by induction from the inductor $o$, through the substance of the cylinder H, a greater negative charge than before, which again is carried on to augment the negative charge in the inductor $o$, this inducing a strong positive charge in the carrier $m^2$ as it passes that inductor, which charge is for the second time added to that in the first inductor, $o$. Each turn thus augments the charge on both inductors in a constantly-increasing ratio, and the only limit to the charge which can thus be accumulated on the inductors is that determined by the third pair of contact-springs, $l'$, leading to the wires which pass through the lighting-tube and end in the sparking-points $k^3$ and $k^4$; and when the difference of potential between the inductor becomes sufficiently great the electricity, instead of continuing to accumulate upon the inductors, augmenting their charges, is delivered by the carrier to the contact-spring $l'$, and passing up the wires $k$ and $k'$ recombines in the form of sparks, which pass in a continuous supply between the points $k^3$ and $k^4$.

A condenser, $e$, may, if preferred, be connected between the wires leading from the springs $l'$, and under certain conditions may aid in the effectiveness of the sparks.

I have merely described the operation of one of the carriers; but it is very evident that the same succession of electrical changes is continually occurring in all of them, the whole working harmoniously together, first, to excite the inductors to their maximum capacity, and then to conduct the surplus electricity by way of the sparking-points.

It is evident that the arrangement which I have described may be reversed, the inductors being placed on the inner revolving cylinder and the carriers on the outer cylinder, without departing from my invention. It is also evident that the details of the actuating mechanism may be greatly varied without departing from the spirit of my invention, since that I have shown and described is particularly adapted to apparatus of portable size.

By my invention I am enabled to construct a spark-producing electrical generator of great efficiency, cleanliness, and durability, which is also characterized by extreme comparative lightness and by absolute freedom from noxious or corrosive acids or chemicals.

I make no claim herein to the combination of my electrostatic induction generator with other instrumentalities in the form of a gas-igniting apparatus, as I have claimed such a combination in a separate application for Letters Patent filed July 12, 1884, Serial No. 137,515; neither do I broadly claim the construction of a convection-induction generator of electricity, as such machines, broadly speaking, are not new, the Holtz machine being a well-known type; but What I do claim, and desire to secure by Letters Patent, is—

1. A convection-induction machine or electrostatic inductive generating device constructed in a cylindrical form and comprising an outer cylinder of ebonite or similar material, supporting armatures or inductors of metal foil, an inner cylinder of like material supported on pivots or journals, and adapted to rotate within the outer cylinder, and supporting carriers of metal foil, contact-springs mechanically attached to the outer cylinder and extending within the inner cylinder, so as to make contact successively with the carriers when said inner cylinder is rotated, whereby the electrical charges induced on said carriers are redistributed, and leading-out wires or electrodes electrically connected with two of the said contact-springs and serving as terminals of the generator, substantially as hereinbefore described.

2. An electrostatic inductive generating apparatus constructed in cylindrical form, and comprising an outer cylinder of hard rubber, or similar material, supporting on its interior surface armatures or inductors of metal foil, an inner cylinder of like material supporting carriers of metal foil and adapted to rotate within the outer cylinder, contact-springs whereby the charges induced upon the said carriers are redistributed, and means, as indicated, whereby the said inner cylinder may be rotated with reference to the outer, substantially as described.

3. In an electrostatic machine substantially of the character described herein, the inclosing-case of ebonite, vulcanite, or like dielectric, supporting on its inner surface the inductive armatures of said machine, and adapted when rubbed on its external surface to re-excite the said machine should it become discharged.

4. The combination, with the hereinbefore-described electrostatic generator, comprising two concentric cylinders, one of which is adapted to be rotated within the other, of the mechanism for revolving the internal cylinder, consisting of a rack actuated by a push-button from the outside of the outer cylinder and reacted upon by springs, together with accelerating gear, and a ratchet and pawl, substantially as and for the purposes specified.

In testimony whereof I have signed my name to this specification, in the presence of two subscribing witnesses, this 18th day of November, 1884.

CHARLES LEIGH CLARKE.

Witnesses:
 ARTHUR E. HALL,
 ALBERT E. HALL.
   9 Mount Manchester.